United States Patent
Bellamy et al.

(10) Patent No.: US 8,564,620 B2
(45) Date of Patent: Oct. 22, 2013

(54) METHOD FOR AUTOMATICALLY ADJUSTING THE RENDERED FIDELITY OF ELEMENTS OF A COMPOSITION

(75) Inventors: Rachel K. E. Bellamy, Bedford, NY (US); Michael Desmond, White Plains, NY (US); Jacquelyn A. Martino, Cold Spring, NY (US); Paul M. Matchen, Briarcliff Manor, NY (US); John T. Richards, Hawthorne, NY (US); Calvin B. Swart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/900,044

(22) Filed: Oct. 7, 2010

(65) Prior Publication Data
US 2012/0086724 A1    Apr. 12, 2012

(51) Int. Cl.
  *G09G 5/00* (2006.01)
  *G06F 17/00* (2006.01)
  *G06T 17/00* (2006.01)
(52) U.S. Cl.
  USPC .......................... 345/629; 345/418; 345/428
(58) Field of Classification Search
  USPC .................. 345/418, 428, 619, 629
  See application file for complete search history.

(56) References Cited

U.S. PATENT DOCUMENTS

| | | | |
|---|---|---|---|
| 7,580,816 B2* | 8/2009 | Thompson et al. | 703/2 |
| 2001/0038718 A1* | 11/2001 | Kumar et al. | 382/284 |
| 2003/0095701 A1* | 5/2003 | Shum et al. | 382/155 |
| 2009/0058860 A1* | 3/2009 | Fong et al. | 345/467 |
| 2009/0278848 A1* | 11/2009 | Robertson et al. | 345/440.2 |

OTHER PUBLICATIONS

Landay et al., Interactive Sketching for the Early Stages of User Interface Design, http://www.cs.berkeley.edu/~landay/research/publications/SILK_CHI/jal1bdy.html.
Landay et al., Sketching Interfaces: Toward More Human Interface Design, Computer, Mar. 2001, http://www.cs.cmu.edu/~garnet/silk-ieee-published.pdf.
Sezgin et al., Sketch based interfaces: early processing for sketch understanding, ACM SIGGRAPH 2006 Courses (Boston, Massachusetts, Jul. 30-Aug. 3, 2006), SIGGRAPH '06. ACM, New York, NY, 22. DOI= http://doi.acm.org/10.1145/1185657.1185783.

* cited by examiner

*Primary Examiner* — Aaron M Richer
*Assistant Examiner* — Robert Craddock
(74) *Attorney, Agent, or Firm* — Scully, Scott, Murphy & Presser, P.C.; Louis J. Percello, Esq.

(57) ABSTRACT

Automatically adjusting rendered fidelity of an element in a composition may include detecting an element added to a composition and determining fidelity of an added element's rendering based on rendering of one or more other elements in the composition. Rendering of the added element may be automatically adjusted to the determined fidelity to match the rendering of said one or more other elements in the composition.

23 Claims, 4 Drawing Sheets

METHOD FOR AUTOMATICALLY ADJUSTING THE RENDERED FIDELITY OF ELEMENTS OF A COMPOSITION

FIELD

The present application generally relates to computer systems, computer drawing tools, and more particularly to automatically adjusting rendered elements in a drawing or graphical composition.

BACKGROUND

People routinely employ sketching of diagrams during design phases in a project. They draw on paper and whiteboards, and increasingly their electronic counterparts, as an aid to thinking, communicating and/or sharing their thoughts with others. Manual sketches have the virtue of being rapidly produced without the cognitive overhead associated with the use of drawing software. Sketches also suggest, generally appropriately, that the ideas they embody are not fully formed and are open to further improvement. This can be advantageous when conveying the idea to others since people may be more likely to stay engaged at the conceptual level when discussing a sketch.

Sketches, however, typically start out as a blank "sheet", and usually the sketches alone cannot provide the ability of reusing the elements it contains; that is, manually drawn sketches do not provide support for reusability. Some tools allow a drawn element to be saved and recalled for later use (see for example Adobe™ Flash™ and their use of "symbols"). Other tools provide a set of possible design elements, typically arranged in "palettes", which can be added to a design composition (see for example Microsoft™ Visio™). But no tools allow one to create a diagram that incorporates both free hand elements and reused elements where the result is stylistically coherent. The diagram will either have some elements sketched and some elements from the palettes or, in the case of mostly experimental prototypes, all sketched elements mapped to the most likely palette element through a process of stroke recognition and displayed as the recognized element (for example, turning roughly circular closed forms into perfect circles).

BRIEF SUMMARY

A method and system for automatically adjusting rendered fidelity of an element in a composition may be provided. The method, in one aspect, may include detecting an element added to a composition and determining the fidelity of an added element's rendering based on the rendering of one or more other elements in the composition. The method may also include automatically adjusting the rendering of the added element to the determined fidelity to match the rendering of said one or more other elements in the composition. The method may further include presenting the automatically adjusted rendered element.

A system for automatically adjusting rendered fidelity of an element in a composition, in one aspect, may include a module operable to detect an element added to a composition. The module may be further operable to determine fidelity of an added element's rendering based on the rendering of one or more other elements in the composition. The module may be yet further operable to automatically adjust the rendering of the added element to the determined fidelity to match the rendering of said one or more other elements in the composition. A user interface may be operable to present the automatically adjusted rendered element.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method are disclosed, in one aspect, that automatically adjust the rendered fidelity of an element or elements in a composition based on the rendered fidelity of other elements in the composition or other determinants of rendered style. A composition refers to a drawing. For example, a composition may be created using a drawing tool or like software that allows a user to draw on a computer input medium (e.g., a touch sensitive tablet or touch screen overlaid on a computer display) using a "pencil" or "brush" tool to draw free-hand sketches, and/or selecting pre-defined drawing elements such as an oval, rectangle, curve, straight line, and, for example, dragging an instance out of a palette of such elements and dropping it on the input medium. "Rendered fidelity" or "fidelity" herein refers to the degree to which the element that is displayed following an input gesture corresponds to either a hand-drawn stroke or a pre-defined element.

Figure 3A:
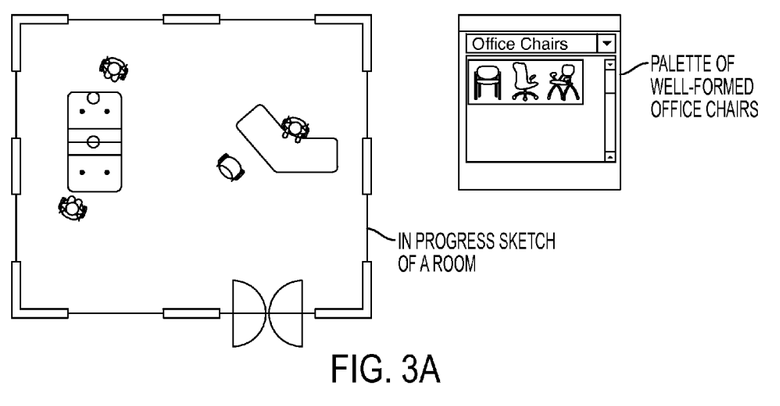
FIGS. 3A and 3B show what might happen if a well-formed chair element is dropped on a roughly drawn sketch, for example, adjusting of the rendered fidelity of an element.
Figure 3B:
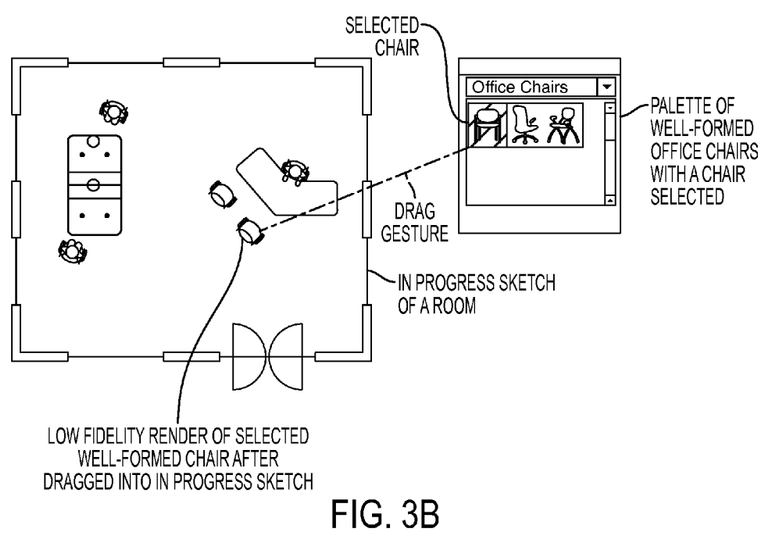

For example, the system and/or methodology of the present disclosure may convert a pre-defined element—e.g., a chair dragged from a Visio™ palette used to design a room layout—from a well-formed image to a roughly drawn sketch when it is added to a roughly drawn sketch of a room. A roughly drawn sketch refers to what one might produce with a pencil on paper. In such a sketch lines that should be parallel (if they perfectly mirrored the physical object they corresponded to) tend not to be exactly parallel, elements that should be perfectly symmetric are not symmetric, line widths are not uniform, and so on. A well-formed image refers to what one typically finds in palettes of pre-defined drawing elements. These include squares with perfectly equal sides and 90 degree angles, perfectly formed circles, or in the case of the chair example, an element with perfect symmetry, straight lines, and smooth curves and so on. FIGS. 3A and 3B show what might happen if a well-formed chair element is dropped on a roughly drawn sketch. The well-formed chair selected and drawn into the composition is rendered to have its fidelity adjusted according to the other elements in the composition.

Even in the case in which a well-formed element is rendered as a roughly drawn sketched element it is noted that the other properties of the element need not be lost. Specifically, the fact that a chair was added to the drawing (even though it is rendered as if it had been roughly drawn thus preserving the stylistic coherency of the overall room sketch) would not lose the fact that it was a chair that had been placed in the drawing. If the chair had other properties associated with it (for example fabric options, cost ranges, ergonomic adjustability features, constraints such as "cannot be wall-mounted) these properties would remain. That is, only the appearance of the chair in the sketch would be altered, in one embodiment. In addition, the alteration of appearance need not be irrevocable. Later in the design process, the chair may be "up-rendered" to take on a more regularized, professional, appearance such as that of the original element in the palette of pre-defined elements.

The visual fidelity of elements in a composition in the present disclosure may be considered along a somewhat continuous dimension. One could imagine going either up or down this dimension at will, applying the visual transformations to either the entire composition or portions of the composition. Consider, for example, the addition of what appears to be black marker lines overlaid on the outline of what appears to be pencil-sketched elements to indicate they are more firmly established as elements of the final composition.

In the example used so far the sketch of the room provides the context determining how a new element dragged from the palette of pre-existing elements is rendered. But the notion of context can also be extended to a corpus of compositions, or a style of composition, and need not be limited to the context provided by the rendered fidelity or style of elements within a single composition. For example, a collection of drawings may define a style that determines how a new element is rendered even if dropped into an empty drawing. This might help, for example, in causing new drawings to stay stylistically consistent with a larger collection of drawings. Finally, the notion here is not limited to visual fidelity. The same idea may be applied to a musical composition recorded at a low sample rate with audible background hiss into which a high fidelity loop (one recorded at a high sample rate with no background hiss) is added. In this case, the new loop would be played as if it was recorded at a low sample rate with audible background hiss.

Figure 1:
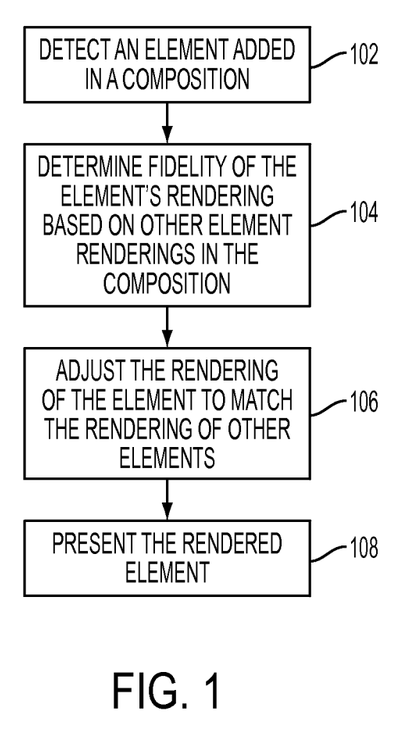
FIG. 1 is a flow diagram that illustrates method logic of the present disclosure in one embodiment.

FIG. 1 is a flow diagram that illustrates a method of the present disclosure in one embodiment. At 102, an element added to a composition may be detected. For instance, a user may add an element to a composition. This may be done by copying and pasting an element from a drawing tool or like software onto a composition (e.g., a blank page in a drawing tool or an exiting page in a drawing tool). An element may be added to a composition also by dragging and dropping of an item in a drawing tool or like software, by free-hand sketching, free-hand sketching with shape recognition, or by voice recognition. Free hand sketching with shape recognition or voice recognition may be implemented according to the description found in the following publications: "Interactive Sketching for the Early Stages of User Interface Design," available form "http://www.cs.berkeley.ddu/~landay/research/publications/SILK_CHI/jal1bdy.html"; "Sketching Interfaces: Toward More Human Interface Design," available from "http://www.cs.berkeley.edu/~landay/research/publications/silk-ieee-published.pdf"; and Sezgin, T. M., Stahovich, T., and Davis, R. 2006. Sketch based interfaces: early processing for sketch understanding. In *ACM SIGGRAPH 2006 Courses* (Boston, Mass., Jul. 30-Aug. 3, 2006). SIGGRAPH '06. ACM, New York, N.Y., 22. DOI=http://doi.acm.org/10.1145/1185657.1185783. Those publications are incorporated herein by reference.

At 104, a system or a functionality of the present disclosure in one embodiment may determine the appropriate fidelity of an added element's rendering based on the rendering of other elements in the composition. This could be done, for example, by determining the rendered fidelity of other elements in the drawing, for instance, by taking the average fidelity of all elements in the drawing along a composite dimension of such things as line regularity, equality of angles, and so forth. In one aspect, the determining of the rendered fidelity of other elements in the drawing may be with respect to other similar elements in the drawing. The determined fidelity of the other elements may be then used to adjust the rendering of a new element.

At 106, a system or a functionality of the present disclosure in one embodiment may automatically change or adjust the element's rendering to match the determined rendered fidelity of the other elements in the composition. This adjustment could take the form of algorithmic modifications to the element (e.g., slightly perturbing lines to be slightly non-uniform, angles slightly unequal, etc.) or the form of automatically selecting one from a set of exemplars of roughly-drawn sketched elements, either those already in the drawing or ones for a larger collection of roughly-drawn elements.

At 108, the rendered element whose fidelity has adjusted is presented, for instance, within the context of other elements in the composition. Examples are shown in FIGS. 3A and 3B.

Thus, the rendered fidelity of an element or elements in a composition may be adjusted automatically based on the rendered fidelity of other elements in the composition or other determinants of rendered style (e.g., the rendered fidelity of a larger collection of drawings of which the new drawing is meant to be a part). The rendered fidelity of elements already present in a drawing may also be adjusted automatically in response to an element of a certain type being added to a composition (e.g., one which for reason of policy or purpose cannot be rendered in a lower fidelity way). Similarly, the rendered fidelity of elements already present in a drawing may be adjusted automatically in response to detecting that an element of the composition is changed (e.g., by the user indicating that one of the elements now needs to be rendered at a different level of fidelity from its current rendering).

The rendered fidelity of an element may be adjusted automatically by applying an action to the entire composition or one or more regions of the composition. This could be done, for example, by selecting an element and then invoking a menu choice to adjust the fidelity, or by selecting a group of elements and adjusting a slider controlling the rendered fidelity of the selected elements. Rendered fidelity could again be adjusted based on algorithmic or examplar-based logic as mentioned above.

In another aspect, the rendered fidelity of an element may be adjusted automatically based on the intended use of the composition. For example, a drawing that is intended for use in a focus group might stay at the level of a low-fidelity sketch to keep participants focused on the idea rather than details of the rendering. Alternatively, the same drawing could be rendered as if composed only of well-formed elements for use in a presentation to a board of directors or other similar formal body.

Yet in another aspect, the rendered fidelity of an element may be adjusted automatically based on the output medium for the composition. For example, a small handheld display may require that a roughly-drawn sketch be rendered as if composed only of well-formed elements since their regular shapes would aid in their being visually recognizable at a small size as compared with roughly-drawn and irregular shapes.

The adjusting of the elements may be based on an analysis of the elements in the composition. For example, the average fidelity of all elements could be computed by examining their drawn aspects (e.g., line width regularity, equality of angles, degree to which lines are parallel and of equal lengths), converting those aspects to a single measure of fidelity and taking the average) or by averaging an already computed index of fidelity associated with each element and contained in the data structure representing that element.

The adjusting of the elements may be also based on an analysis of a corpus of compositions. This could be done simply by extending the analysis described above across a collection of drawings. This collection could be, for example, all drawings in a given folder or folders in a file system, all drawings matching a set of search terms, or all drawings returned from a complex database query.

The adjusting of the element may be further based on the application of a style rule or rules. A style rule could specify, for example, that all strokes be rendered as if drawn with a pen tip of a certain shape leaving a trace that is smoothed by averaging over a moving window of 32 pixels. Another style rule might specify that only shapes with sharp angles but not smoothly curving strokes be converted to a more well-formed element. Style rules could be specified in a specialized language, or by way of examples, or by an automatic analysis of a collection of drawings.

Still yet in another aspect, the adjustment of fidelity of the elements may be applied to a visual element (e.g., line width, line regularity), to an auditory element (e.g., sample rate, background noise), to an animation sequence (e.g., frame rate, vibration cancelling), or to a three-dimensional (3-D) depiction (e.g., perspective, depth), or combinations thereof. While the details of such adjustment depend on the nature of the element itself (visual elements being adjusted using techniques such as line smoothing, line joining, or angle equalization, auditory elements being adjusted using such techniques as sub sampling of the wave form, or application of high pass filtering, animation sequences being adjusted using techniques such as dropping frames at a regular interval, or interpolating frames between existing frames, and three-dimensional depictions being adjusted using techniques such a perspective alteration or flattening onto a two-dimensional projection) all such adjustments can be based on either algorithmic manipulation, recognition based techniques, or a combination of these.

The adjustment of fidelity may be applied uniformly to each similar element. The adjustment of fidelity may be applied with seemingly random perturbations to each similar element. For example, well-formed elements being rendered at lower fidelity could have random variations in the degree to which lines had irregular widths, the angles of the drawing were unequal and so on. This would help preserve the sense that the elements were drawn by a human being.

The fidelity of an element or elements may be adjusted down (e.g., to appear less regular, less professionally rendered). This can be done either algorithmically or through a recognition-based process. Algorithmically, it could be implemented by segmenting the well-formed element into line segments at points of maximum curvature, and then causing some of the line segments to be connected and others to be separated by small gaps. In addition, individual line segments could be replaced by a set of pixels with unequal density along the main tangent of the line. Using recognition, the best fitting exemplar from a set of exemplars could be selected as the form to be rendered.

Similarly, the fidelity of an element or elements may be adjusted up (e.g., to appear more regular, more professionally rendered). This can be done either algorithmically or through a recognition-based process. Algorithmically, it could be implemented by segmenting the roughly-drawn element into line segments at points of maximum curvature, and then causing the line segments that are not connected in the roughly-drawn element to be connected. In addition, individual strokes could be replaced by line segments of equal density along the main tangent of the stroke. Using recognition, the best fitting exemplar from a set of exemplars could be selected as the form to be rendered.

In one embodiment, even with the adjusting, other attributes of an adjusted element may be preserved, i.e., not changed. For example, element's object properties including its other possible renderings may be preserved. For example, the original strokes drawn by the person creating the drawing could be recorded and linked to the element's internal representation. This would allow the element to revert to its original form if needed. To take another example, a well-formed element could have pre-defined alternative renderings that vary along the dimension of visual fidelity allowing the fidelity to be easily changed by just selecting one of the set of alternative renderings.

Figure 2:
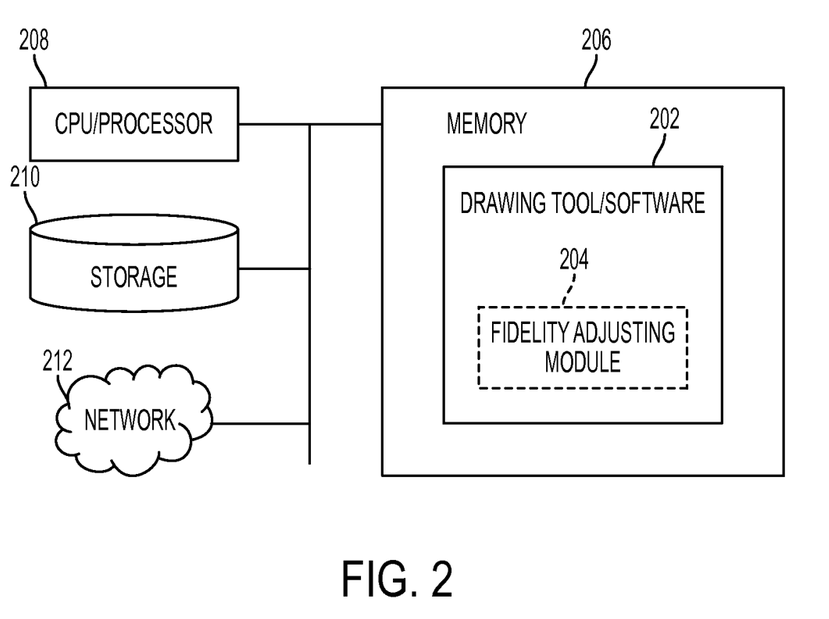
FIG. 2 is a system diagram illustrating components in one embodiment of the present disclosure.

FIG. 2 is a system diagram illustrating components in one embodiment of the present disclosure. A drawing tool or like software 202 provides capability to draw using a free hand tool or by selecting predefined elements. Drawings for example are made in a computer file, e.g., visually depicted on a display or the like and saved in a computer readable format in memory or storage. A module or a functionality 204 of the drawing tool may enable rendered (or drawn) elements to be adjusted in their form or shape, e.g., from a formal pre-defined element to a hand-drawn, sketchy shape. Similarly, the drawn element may be adjusted in their form or shape from a hand-drawn, sketchy shape to a formal pre-defined element shape.

A drawing tool 202 and a module or functionality 204 of the drawing tool of the present disclosure may be loaded into computer memory 206 and executed by a processor 208 for performing their functionalities, for instance, as described above. For instance, stored version of drawing tool 202 and a module or functionality 204 of the drawing tool of the present disclosure stored on a disk storage or the like 210 may be loaded into memory 206. The drawing tool 202 and a module or functionality 204 of the drawing tool of the present disclosure may be also loaded into memory 206 from a network 212.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

Figure 4:
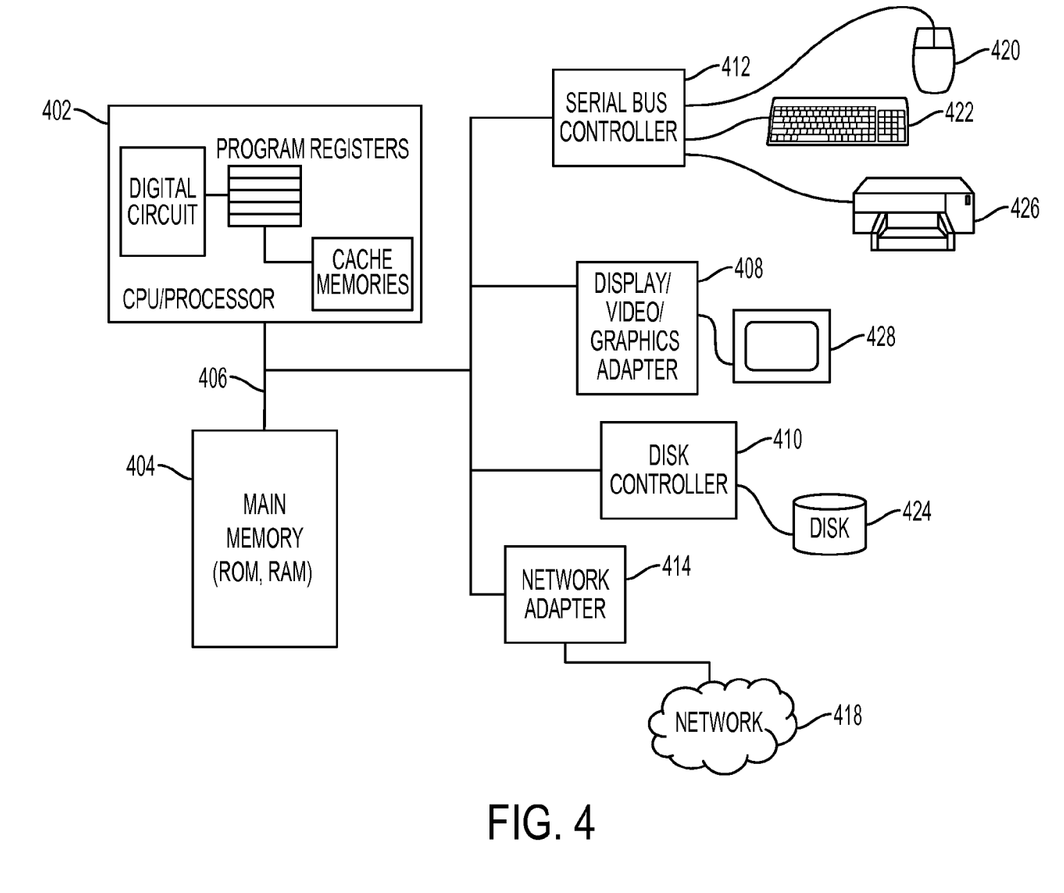
FIG. 4 illustrates an example of a computer system, in which the systems and methodologies of the present disclosure may be carried out or executed.

FIG. 4 illustrates an example computer system that may implement the system and/or method of the present disclosure. One or more central processing units (CPUs) 402 may include arithmetic/logic unit (ALU), fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 402 uses. Shown is a simplified hardware configuration. CPU 402 may include other combination circuits and storage devices. One or more central processing units (CPUs) 402 execute instructions stored in memory 404, for example, transferred to registers in the CPU 402. Buses 406, for example, are electrical wires that carry bits of data between the components. Memory 404 may include an array of dynamic random access memory (DRAM) chips, and store program and data that CPU 402 uses in execution. The system components may also include input/output (I/O) controllers and adapters connected to the CPU 402 and memory 404 via a bus, e.g., I/O bus and connect to I/O devices. For example, display/graphic adapter connects 408 a monitor 428 or another display device/terminal; disk controller 410 connects hard disks 424, for example, for permanent storage; serial controller 412 such as universal serial bus (USB) controller may connect input devices such as keyboard 422 and mouse 420, output devices such as printers 426; network adapter 414 connects the system to another network, for example, to other machines. The system may also include expansion slots to accommodate other devices to connect to the system. For example, a hard disk 424 may store the program of instructions and data that implement the above described methods and systems, which may be loaded into the memory 404, then into the CPU's storage (e.g., caches and registers) for execution by the CPU (e.g., ALU and/or other combinational circuit or logic). In another aspect, all or some of the program of instructions and data implementing the above described methods and systems may be accessed, and or executed over the network 418 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for automatically adjusting rendered fidelity of an element in a composition, comprising:

detecting an element added to a composition;

determining, by a processor, a first fidelity of an added element's rendering based on a rendering of one or more other elements in the composition;

adjusting automatically, by a processor, a rendering of the added element having a second fidelity to the determined first fidelity to match the rendering of said one or more other elements in the composition; and presenting the automatically adjusted rendered element, wherein responsive to determining that the first fidelity corresponds to a roughly drawn sketch and the second fidelity corresponds to a well-formed image, the adjusting comprises adjusting the rendering of the added element to match the roughly drawn sketch.

2. The method of claim 1, wherein the presenting includes visually displaying the automatically adjusted rendered element on a user interface display screen.

3. The method of claim 1, wherein the presenting includes audibly playing the automatically adjusted rendered element.

4. The method of claim 1, wherein the step of adjusting further includes adjusting a rendering of an element in the composition in response to detecting a change in one or more of other elements present in the composition.

5. The method of claim 1, wherein the adjusting further includes applying an action to the entire composition or a region of the composition.

6. The method of claim 1, wherein the adjusting is based on an intended use of the composition, or an output medium of the composition or combinations thereof.

7. The method of claim 1, wherein the step of adjusting is based on an analysis of the one or more elements of the composition, or a corpus of compositions, a user's selected style, or application of one or more rules, or combinations thereof.

8. The method of claim 1, wherein the step of adjusting is applied to a visual element, an auditory element, an animation sequence, or a 3-dimensional element, or combinations thereof.

9. The method of claim 1, wherein the adjusting further includes uniformly applying the fidelity to each similar element in the composition, or with random perturbations to each similar element.

10. The method of claim 1, further including preserving all other attributes associated with the added element.

11. The method of claim 1, wherein the element is added to the composition by copying and pasting, dragging and dropping, free-hand sketching, free-hand sketching with shape recognition, or voice recognition, or combinations thereof.

12. A system for automatically adjusting rendered fidelity of an element in a composition, comprising:
a processor;
a module operable to detect an element added to a composition, the module further operable to determine a first fidelity of an added element's rendering based on rendering of one or more other elements in the composition, the module further operable to automatically adjust a rendering of the added element having a second fidelity to the determined first fidelity to match the rendering of said one or more other elements in the composition; and
a user interface operable to present the automatically adjusted rendered element,
wherein responsive to determining that the first fidelity corresponds to a roughly drawn sketch and the second fidelity corresponds to a well-formed image, the adjusting comprises adjusting the rendering of the added element to match the roughly drawn sketch.

13. The system of claim 12, wherein the module further adjusts rendering of an element in the composition in response to detecting a change in one or more of other elements present in the composition.

14. The system of claim 12, wherein the module further applies an adjusting action to the entire composition or a region of the composition.

15. The system of claim 12, wherein the module performs adjusting based on an intended use of the composition, or an output medium of the composition or combinations thereof.

16. The system of claim 12, wherein the module performs adjusting based on an analysis of the one or more elements of the composition, or a corpus of compositions, a user's selected style, or application of one or more rules, or combinations thereof.

17. The system of claim 12, wherein the module applies adjusting to a visual element, an auditory element, an animation sequence, or a 3-dimensional element, or combinations thereof.

18. The system of claim 12, wherein the module adjusts the fidelity uniformly to each similar element in the composition, or with random perturbations to each similar element.

19. The system of claim 12, further including preserving all other attributes associated with the added element.

20. A computer readable storage medium, excluding signal per se, storing a program of instructions executable by a machine to perform a method automatically adjusting rendered fidelity of an element in a composition, comprising:
detecting an element added to a composition;
determining, by a processor, a first fidelity of an added element's rendering based on a rendering of one or more other elements in the composition;
adjusting automatically, by a processor, a rendering of the added element having a second fidelity to the determined first fidelity to match the rendering of said one or more other elements in the composition; and
presenting the automatically adjusted rendered element,
wherein responsive to determining that the first fidelity corresponds to a roughly drawn sketch and the second fidelity corresponds to a well-formed image, the adjusting comprises adjusting the rendering of the added element to match the roughly drawn sketch.

21. The computer readable storage medium of claim 20, further including preserving all other attributes associated with the added element.

22. The computer readable storage medium of claim 20, wherein the adjusting is based on an intended use of the composition, or an output medium of the composition or combinations thereof.

23. The computer readable storage medium of claim 20, wherein the step of adjusting is based on an analysis of the one or more elements of the composition, or a corpus of compositions, a user's selected style, or application of one or more rules, or combinations thereof.

* * * * *